United States Patent
Gadalin et al.

(10) Patent No.: US 11,803,407 B1
(45) Date of Patent: Oct. 31, 2023

(54) EMULATION LAYER FOR OVERCOMING INCOMPATIBILITIES IN VIRTUAL MACHINE INSTANCE MIGRATION

(71) Applicant: Amazon Technologies, Inc., Seattle, WA (US)

(72) Inventors: Alexey Gadalin, Kirkland, WA (US); Ethan John Faust, Seattle, WA (US); Anton Valter, Renton, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 192 days.

(21) Appl. No.: 17/037,510

(22) Filed: Sep. 29, 2020

(51) Int. Cl.
*G06F 9/455* (2018.01)
*G06F 9/50* (2006.01)

(52) U.S. Cl.
CPC ........ *G06F 9/45558* (2013.01); *G06F 9/4552* (2013.01); *G06F 9/5077* (2013.01); *G06F 2009/4557* (2013.01); *G06F 2009/45562* (2013.01); *G06F 2009/45595* (2013.01)

(58) Field of Classification Search
CPC .................................................. G06F 9/45558
USPC ........................................................... 718/1
See application file for complete search history.

(56) References Cited

U.S. PATENT DOCUMENTS

| | | | | |
|---|---|---|---|---|
| 7,506,037 B1 * | 3/2009 | Ciano | .................. | G06F 9/4856 709/221 |
| 9,329,886 B2 * | 5/2016 | Vincent | ............... | G06F 9/45558 |
| 9,495,183 B2 * | 11/2016 | Bond | .................. | G06F 9/45545 |
| 9,569,246 B2 * | 2/2017 | Roehrig | ............. | H04L 67/1095 |
| 11,055,896 B1 * | 7/2021 | Nikitenko | ............. | G06T 15/005 |
| 2002/0129126 A1 * | 9/2002 | Chu | ....................... | G06F 9/4856 709/224 |
| 2005/0235287 A1 * | 10/2005 | Harper | ...................... | G06T 1/20 718/100 |
| 2008/0235378 A1 * | 9/2008 | Fried | ..................... | G06F 9/4856 709/226 |
| 2009/0070760 A1 * | 3/2009 | Khatri | .................. | G06F 9/5044 718/1 |
| 2009/0260006 A1 | 10/2009 | Horta | | |
| 2009/0304011 A1 * | 12/2009 | Smith | .................. | G06F 3/0683 370/463 |
| 2011/0054879 A1 * | 3/2011 | Bogsanyl | ............ | G06F 9/45558 718/1 |
| 2011/0265084 A1 * | 10/2011 | Knowles | ................. | G06F 9/461 718/1 |

(Continued)

OTHER PUBLICATIONS

U.S. Appl. No. 17/037,513, filed Sep. 29, 2020.
Non-Final Office Action for U.S. Appl. No. 17/037,513 dated 12/219/2022.

*Primary Examiner* — Mehran Kamran
(74) *Attorney, Agent, or Firm* — Thomas Horstemeyer, LLP

(57) ABSTRACT

Disclosed are various embodiments for an emulation layer for overcoming incompatibilities in virtual machine instance migration. In one embodiment, a virtual machine instance configured for a first computing architecture is executed in a first computing device having the first computing architecture. The virtual machine instance from the first computing device is migrated to a second computing device having a second computing architecture. The virtual machine instance is executed in the second computing device using an emulation layer that emulates the first computing architecture in the second computing architecture.

20 Claims, 7 Drawing Sheets

(56) References Cited

U.S. PATENT DOCUMENTS

| | | | |
|---|---|---|---|
| 2013/0246771 A1* | 9/2013 | Farrell | G06F 9/3005 |
| | | | 712/227 |
| 2014/0165063 A1* | 6/2014 | Shiva | G06F 9/45533 |
| | | | 718/1 |
| 2014/0359613 A1* | 12/2014 | Tsirkin | G06F 9/4856 |
| | | | 718/1 |
| 2015/0331704 A1* | 11/2015 | Abali | G06F 9/455 |
| | | | 718/1 |
| 2016/0117121 A1* | 4/2016 | Bohn | G06F 3/064 |
| | | | 711/114 |
| 2016/0132350 A1* | 5/2016 | Doi | G06F 9/4856 |
| | | | 718/1 |
| 2018/0024854 A1* | 1/2018 | Wang | G06F 12/1027 |
| | | | 718/1 |
| 2018/0074840 A1* | 3/2018 | Chai | G06F 9/4862 |
| 2018/0246757 A1* | 8/2018 | Li | G06F 9/45558 |
| 2019/0213034 A1* | 7/2019 | Vincent | G06F 9/45558 |
| 2019/0310880 A1* | 10/2019 | Gupta | G06F 9/45533 |
| 2021/0006395 A1 | 1/2021 | Durham et al. | |
| 2021/0263762 A1* | 8/2021 | Kachare | G06F 12/0868 |

\* cited by examiner

EMULATION LAYER FOR OVERCOMING INCOMPATIBILITIES IN VIRTUAL MACHINE INSTANCE MIGRATION

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
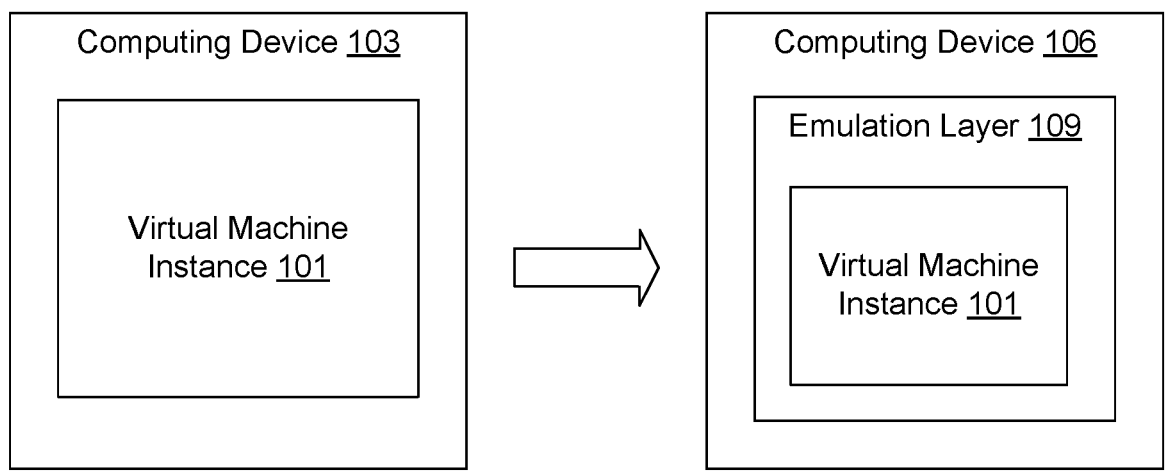
FIG. 1 is a drawing of an example scenario involving use of emulation to execute a virtual machine instance on otherwise incompatible hardware according to various embodiments of the present disclosure.

The present disclosure relates to the use of an emulation layer in order to execute a virtual machine instance on different hardware than for which the corresponding virtual machine image is configured. Often computer software is executable only on a specific hardware platform. For performance reasons, code written in a programming language is usually compiled to machine code or binary code that is executable within a specific operating system and by a specific family of processors. In addition, operating systems are compiled for a specific family of processors. Thus, an application compiled for an x86 architecture cannot be directly executed on an ARM processor. Despite the use of virtualization and a hypervisor to allow multiple virtual machine instances to share physical hardware, a virtual machine instance configured for execution on an x86 architecture cannot be executed on an ARM processor.

More generally, a virtual machine image is tied to particular underlying hardware. Even though software applications may be written in a platform-independent programming language, the applications are usually compiled to platform-specific machine code. In many cases, an application may be distributed as a platform-specific package or with dependencies on platform-specific packages. Likewise, when a virtual machine image is created or configured, an application is typically installed within the environment of a platform-specific operating system, even if the operating system may be available for multiple platforms.

If a user desires to execute an instance of a virtual machine image on a different platform, the user typically has to create a new version of the virtual machine image for the different platform. This can entail configuring an operating system for the different platform, obtaining binary software packages for the different platform, recompiling code for the different platform, and/or installing the software within the operating system. Such a process can be extremely labor and time intensive, as well as error prone. Consequently, many users may decide simply to stay on older platforms and forego moving to new platforms. In the cloud provider network context, this is also limiting in terms of placement and/or migration of the virtual machine within the fleet of hosts, as any host used to run the virtual machine instance is required to have compatible hardware with the machine image.

By contrast, cloud providers may have substantial incentives to introduce new platforms, and to try to achieve even utilization of the different platforms within the fleet. Due to scale and vertical integration, a cloud provider may develop and offer utility computing capabilities via a custom processor type using an architecture or instruction set that may not be compatible with one or more types of existing virtual machine instances. Using the custom processor type may provide a performance improvement and/or a cost reduction, but in view of the effort required to port a virtual machine instance to the custom processor type, customers may not be motivated to move. As a result, many customers may stay on deprecated virtual machine instance types that are resource inefficient for the cloud provider in terms of rack space, power, and/or cooling, and the platforms that host such deprecated instance types may become over-utilized.

Various embodiments of the present disclosure introduce an emulation layer to allow virtual machine instances configured for one type of computer architecture to be transparently executed in another type of computer architecture. In a first set of embodiments, customers of a cloud provider are able to launch virtual machine instances from a virtual machine image configured for a first architecture or platform in a different architecture or platform without having to reconfigure the virtual machine image. For example, using an emulation layer, a customer may launch an x86 machine image on an ARM-based computer system that is faster and less costly under a utility computing model rather than a native x86-based computer system. Even though the emulation layer may impose a performance penalty, the performance improvement of the ARM-based computer system may outweigh the emulation layer performance penalty. Even if the emulation layer performance penalty were to nullify the performance gains, the customer may still benefit from a lower cost.

In a second set of embodiments, customers of a cloud provider may have their virtual machine instances executed in a first architecture or platform transparently migrated to a second architecture or platform using an emulation layer to resolve any incompatibilities. This can benefit both the customers and the cloud provider by allowing the cloud provider to remove unsupported, deprecated, or legacy hardware, thereby reducing resource consumption and improving reliability, while allowing the customers to avoid interruptions or costly reconfiguration of virtual machine instances.

Migration refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Turning now to FIG. 1, shown is an example scenario 100 involving the use of emulation to execute a virtual machine instance 101 on otherwise incompatible hardware. The virtual machine instance 101 corresponds to a virtual machine image that is configured for execution under a computing device 103 having a first computing architecture. For example, the computing device 103 may have the x86_64 architecture, and the virtual machine instance 101 may include an operating system and applications that are configured for execution under the x86_64 architecture.

For various reasons as will be described, it can be desirable to execute the virtual machine instance 101 in a computing device 106 having a second, different computing architecture. For example, the computing device 106 may have an ARM architecture, which may be incompatible for execution of a virtual machine instance 101 configured for the x86_64 architecture. It may be possible to create a new virtual machine image with an operating system that supports ARM or the same applications compiled for ARM, but such an endeavor may be complex and costly in terms of time and developer resources.

In this example scenario, the same virtual machine instance 101 is executed in the computing device 106 through the use of the emulation layer 109. The emulation layer 109 emulates the first computing architecture within the second computing architecture. Although the emulation layer 109 may impose a performance penalty, a performance improvement of the computing device 106 as compared to the computing device 103 may overcome and potentially exceed the performance penalty. In various embodiments, the emulation layer 109 may be used to launch new virtual machine instances 101 having a virtual machine image created for the first computing architecture, or the emulation layer 109 may be used in migrating existing virtual machine instances 101 from a computing device 103 having the first computing architecture to a computing device 106 having the second computing architecture.

As one skilled in the art will appreciate in light of this disclosure, certain embodiments may be capable of achieving certain advantages, including some or all of the following: (1) improving the performance of computer systems by allowing virtual machine instances to be executed on faster hardware; (2) improving flexibility by allowing virtual machine instances to be executed on otherwise incompatible hardware; (3) facilitating live migration and/or reboot migration of virtual machine instances from one platform to another; (4) allowing outdated hardware to be retired by moving virtual machine instances from that hardware to newer hardware that may require less rack space, power, and/or cooling; (5) allowing hardware that is incompatible with an installed base of software to be utilized; (6) providing the ability to scale computing resources by load balancing across a greater pool of compatible hosts; and so forth. In the following discussion, a general description of the system and its components is provided, followed by a discussion of the operation of the same.

Figure 2:
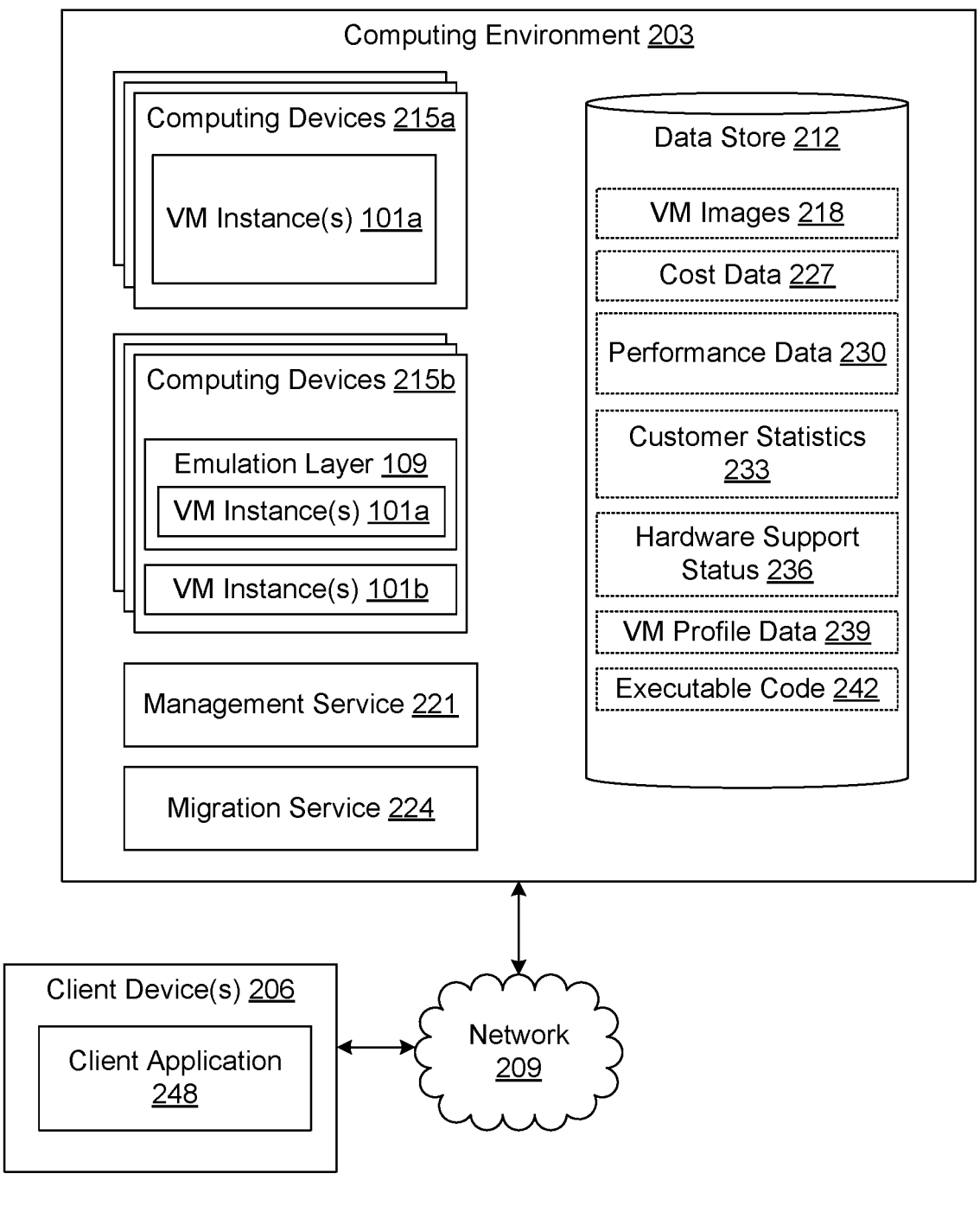
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The networked environment 200 may correspond to a cloud provider network (sometimes referred to simply as a "cloud"), which is a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable loads. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Example regions include U.S. East (located on the east coast of the U.S.), U.S. West (located on the west coast of the U.S.), Europe—London, and Europe—Paris. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) to access resources and services of the cloud provider network. Transit Centers (TC) are the primary backbone locations linking customers to the networked environment 200, and may be co-located at other network provider facilities (e.g., Internet service providers, telecommunications providers). Each region can operate two TCs for redundancy.

Generally, the traffic and operations of a cloud provider network may broadly be subdivided into two categories: control plane operations carried over a logical control plane and data plane operations carried over a logical data plane. While the data plane represents the movement of user data through the networked environment 200, the control plane represents the movement of control signals through the networked environment 200. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

In some embodiments, the computing environment 203 may correspond to a virtualized private network within a physical network comprising virtual machine instances executed on physical computing hardware, e.g., by way of a hypervisor. The virtual machine instances may be given network connectivity by way of virtualized network components enabled by physical network components, such as routers and switches.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The computing environment 203 as part of a cloud provider network offering utility computing services includes computing devices 215a, computing devices 215b, and other types of computing devices. The computing devices 215a and the computing devices 215b may correspond to different types of computing devices 215 and may have different computing architectures. The computing architectures may differ by utilizing processors having different architectures, such as x86, x86_64, ARM, Scalable Processor Architecture (SPARC), PowerPC, and so on. For example, the computing devices 215a may have x86 processors, while the computing devices 215b may have ARM processors. The computing devices 215 may differ also in hardware resources available, such as local storage, graphics processing units (GPUs), machine learning extensions, and other characteristics.

The virtual machine (VM) instances 101 may be instantiated from a virtual machine (VM) image 218 configured for a particular architecture, platform, or hardware present in the computing devices 215a. To this end, customers may specify that a virtual machine instance 101a should be launched in the computing devices 215a as opposed to other types of computing devices 215. The VM instances 101a may be incompatible with the particular architecture, platform, or hardware present in the computing devices 215b.

To execute the virtual machine instances 101a in the computing device 215b, an emulation layer 109 may be used that emulates the particular architecture, platform, or hardware present in the computing devices 215a, but within the computing devices 215b. One commercially available example of an emulation layer 109 is qEMU. In addition to VM instance(s) 101a executing within the emulation layer 109 of the computing devices 215b, the computing device 215b may also execute VM instances 101b that are configured for native execution in the computing device 215b without the use of an emulation layer 109.

In various examples, one VM instance 101 may be executed singularly on a particular computing device 215, or a plurality of VM instances 101 may be executed on a particular computing device 215. Also, a particular computing device 215 may execute different types of VM instances 101, which may offer different quantities of resources available via the computing device 215. For example, some types of VM instances 101 may offer more memory and processing capability than other types of VM instances 101.

The components executed on the computing environment 203, for example, include a management service 221, a migration service 224, and other applications, services, processes, systems, engines, or functionality not discussed in detail herein. The management service 221 is executed to manage the execution of virtual machine instances 101 within a cloud provider network. Authenticated users may, for example, upload, create, or modify virtual machine images 218, launch VM instances 101 based on virtual machine images 218, terminate VM instances 101, configure VM instances 101, enable automatic scaling of VM instances 101, obtain statistics about VM instances 101, and perform other functions. In some scenarios, a user may specify a type of computing device 215 upon which a VM instance 101 will be executed. The type of computing device 215 may be capable of natively executing the VM instance 101, or the type of computing device 215 may require emulation in order to resolve one or more incompatibilities with the VM instance 101. In some cases, the management service 221 may manage the execution of applications or other code on behalf of customers independently from VM instances 101.

The migration service 224 is executed to migrate VM instances 101 from one computing device 215 to another computing device 215. For example, the VM instances 101 may be migrated from a problematic computing device 215 to a different computing device 215. In various scenarios, a VM instance 101 may be migrated from a computing device 215 on which it is natively executed to a computing device 215 upon which it is executed under an emulation layer 109. The emulation layer 109 may be required to resolve one or more incompatibilities with the VM instance 101. The migration that is implemented by the migration service 224 may be a live migration, which provides that the VM instance 101 continues to execute during the process of the migration. Alternatively, the VM instance 101 may be shut down or suspended while being migrated from one computing device 215 to another, such as in the case with a reboot migration.

The data stored in the data store 212 includes, for example, VM images 218, cost data 227, performance data 230, customer statistics 233, hardware support status 236, VM profile data 239, executable code 242, and potentially other data. The VM images 218 correspond to data from which a virtual machine instance 101 may be launched. To this end, a VM image 218 may include an operating system, a file system, one or more applications, configurations, and/or other data. A VM image 218 may be specific to, or configured for, execution on a particular computer architecture or a particular type of computing device 215.

The cost data 227 provides cost information regarding the execution of VM instances 101. Different types of VM instances 101 that are run on different types of computing devices 215 may incur differing costs. For example, a VM instance 101 that is customized for machine learning or graphics processing may be more costly than a VM instance 101 that is customized for basic web service functionality. The cost data 227 may correspond to what is charged to customers of a utility computing provider, such as a cloud provider network. To this end, the cost data 227 may factor in space required for the computing device 215, acquisition cost for the computing device 215, power cost, cooling cost, profit, seasonality, demand, support status for the computing device 215, and/or other factors.

The performance data 230 indicates benchmark performance metrics for different types of computing devices 215 relative to types of VM instances 101. For example, the performance data 230 may indicate a performance improvement for executing a VM instance 101 on a first type of computing device 215 as compared to a second type of computing device 215. The performance data 230 may also indicate a performance penalty associated with the execution of an emulation layer 109 to facilitate compatibility for an otherwise incompatible VM instance 101. The performance data 230 may be generated based upon empirical observation of VM instances 101 across different types of computing devices 215.

The customer statistics 233 may indicate usage, performance and/or cost metrics for VM instances 101 operated by a specific customer. The customer statistics 233 may be utilized to identify particular VM instances 101 that would be candidates for migration to a different type of computing device 215.

The hardware support status 236 indicates a status for the individual computing devices 215. Some types of computing devices 215 may be out of warranty and/or otherwise unsupported by the manufacturer, supplier, or cloud provider network. Some types of computing devices 215 may be deprecated in that such types of computing devices 215 are no longer added to the network 209, or are perhaps no longer actively maintained. VM instances 101 executed on unsupported or deprecated computing devices 215 may be ideal candidates for migration to newer hardware.

The VM profile data 239 indicates hardware resources used by and/or compatibility requirements of particular VM instances 101. The VM profile data 239 may be generated by static analysis of the corresponding VM image 218 or by a dynamic analysis involving runtime profiling of particular VM instances 101. In this regard, the VM profile data 239 may correspond to a fingerprint of resources accessed by the VM instance 101 (e.g., files, local storage, hardware devices, memory requirements, network requirements, etc.), such that compatibility of a computing device 215 may depend on whether the computing device 215 provides the identified resources.

The executable code 242 corresponds to code that can be provided to the management service 221 and executed independently of a VM instance 101. For example, the management service 221 may execute the executable code 242 upon request by a customer, taking in zero or more parameters, and producing a result. The executable code 242 may be in a format (e.g., byte code, machine code, binary code) that is specific to a particular operating system or type of computing device 215 having a particular computing architecture.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 206 may include a display comprising for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 248 and/or other applications. The client application 248 may be executed in a client device 206, for example, to access network content served up by the computing environment 203 and/or other servers, thereby rendering a user interface on the display. The client application 248 may be used by a customer of a cloud network provider or other utility computing provider to interact with the management service 221 and/or the migration service 224 in order to launch VM instances 101, terminate VM instances 101, migrate VM instances 101 to different computing devices 215, cause executable code 242 to be executed, or perform other functions. To this end, the client application 248 may comprise, for example, a browser, a dedicated application, etc., and the user interface may comprise a network page, an application screen, etc. The client device 206 may be configured to execute applications beyond the client application 248 such as, for example, email applications, social networking applications, word processors, spreadsheets, and/or other applications.

Figure 3:
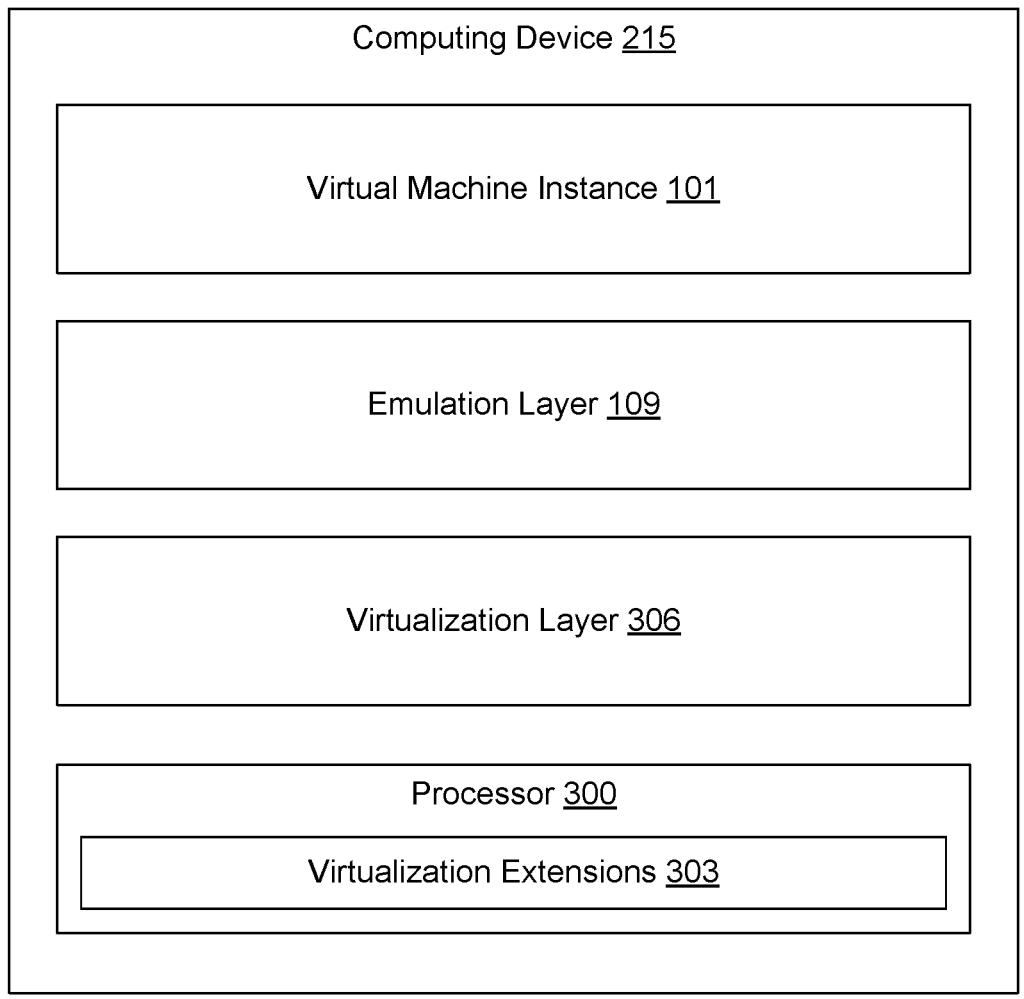
FIG. 3 is a schematic block diagram of a computing device according to various embodiments of the present disclosure.

Continuing to FIG. 3, shown is a block diagram of a computing device 215 according to one or more embodiments. The computing device 215 includes one or more processors 300 having a particular computing architecture such as ARM, x86, or other architectures. The processor 300 may include virtualization extensions 303 in hardware to support virtualization and/or emulation. The computing device 215 further includes a virtualization layer 306, an emulation layer 109, and a virtual machine instance 101 executed on top of both the virtualization layer 306 and the emulation layer 109.

The virtualization layer 306 enables a virtual machine instance 101 to be executed in a virtualized environment so that multiple virtual machine instances 101 may be executed concurrently in the computing device 215. The virtualized environment may virtualize hardware resources, such that each virtual machine instance 101 sees exclusive access to the virtualized hardware resources. The virtualization layer 306 may include a hypervisor to manage the virtual machine instances 101.

The emulation layer 109 emulates or simulates a computing architecture required by the virtual machine instance 101 but not available in the computing device 215. To this end, the emulation layer 109 may emulate an instruction set for the processor 300, emulate local storage using network-based storage, emulate a graphics processing unit (GPU), emulate machine learning customizations for a computing device 215, and so forth.

Although the examples herein discuss a virtual machine instance 101, it is understood that the principles of the present disclosure also pertain to machine instances that do not employ a virtualization layer 306, which are instead executed directly on "bare metal" computing devices 215. In such scenarios, the emulation layer 109 may be employed for compatibility of the machine instance without a corresponding virtualization layer 306.

Figure 4:
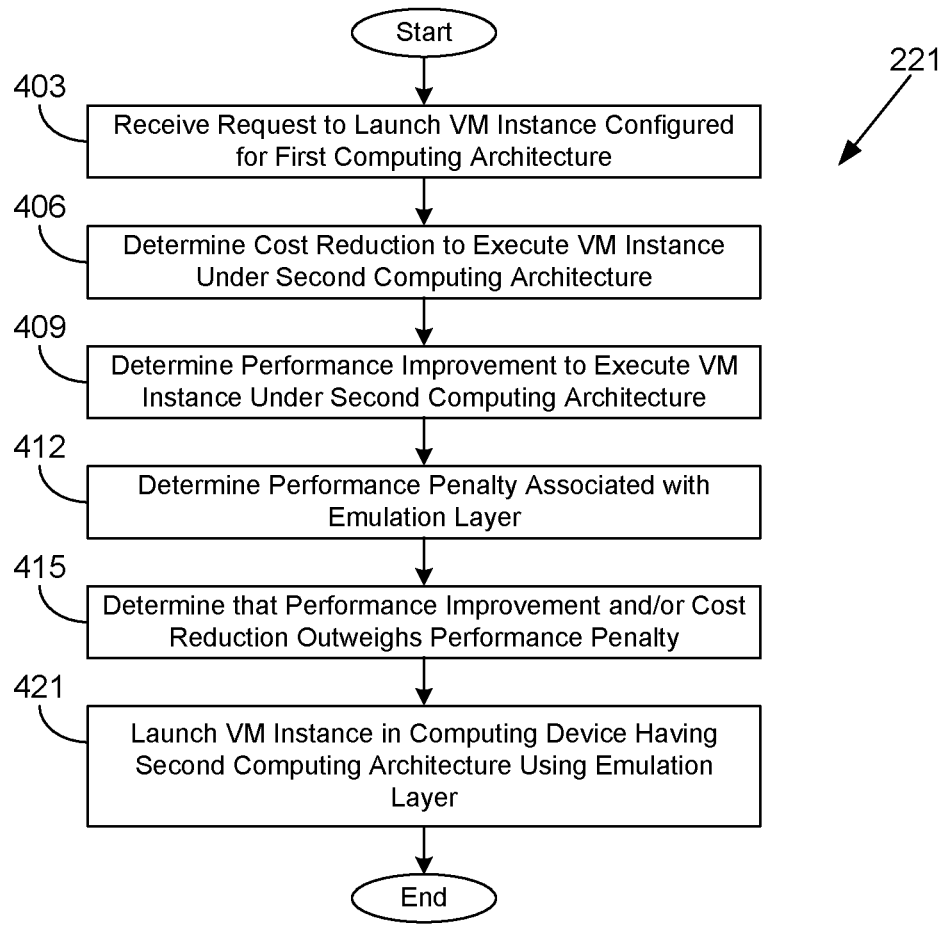
FIGS. 4 and 5 are flowcharts illustrating examples of functionality implemented as portions of a management application executed in a computing environment in the networked environment of FIG. 2 according to various embodiments of the present disclosure.

Referring next to FIG. 4, shown is a flowchart that provides one example of the operation of a portion of the management service 221 according to various embodiments. It is understood that the flowchart of FIG. 4 provides merely an example of the many different types of functional arrangements that may be employed to implement the operation of the portion of the management service 221 as described herein. As an alternative, the flowchart of FIG. 4 may be viewed as depicting an example of elements of a method implemented in the computing environment 203 (FIG. 2) according to one or more embodiments.

Beginning with box 403, the management service 221 receives a request to launch a VM instance 101 (FIG. 2) configured for a first computing architecture. In one scenario, the request is received from a customer via the client application 248 (FIG. 2) over the network 209 (FIG. 2). In another scenario, the request is generated automatically by logic such as automated scaling logic in response to utilization of existing VM instances 101. In one example, the request specifies that the VM instance 101 should be executed on a specific type of computing device 215 (FIG. 2) having a second computing architecture. In another example, the request may leave a particular type of computing device 215 or computing architecture unspecified.

In box 406, the management service 221 determines from the cost data 227 (FIG. 2) a cost reduction associated with executing the VM instance 101 in a computing device 215 having the second computing architecture as opposed to executing the VM instance 101 in a computing device 215 having the first computing architecture. For example, the computing device 215 may be less costly for a customer to use due to lower acquisition costs, lesser rack space, lower power consumption, lesser cooling requirements, and so on.

In box 409, the management service 221 determines from the performance data 230 (FIG. 2) a performance improvement to execute the VM instance 101 in the computing device 215 having the second computing architecture as opposed to a computing device 215 having the first computing architecture. The computing device 215 having the second computing architecture may have a faster processor 300 (FIG. 3), an increased quantity of processors 300 or processing cores, more memory, a faster bus, and/or other characteristics that result in a performance improvement.

In box 412, the management service 221 determines from the performance data 230 a performance penalty associated with the emulation layer 109 (FIG. 2). To execute a VM instance 101 under the emulation layer 109, there may be a performance penalty. In other words, the emulation functionality may have an overhead that consumes processor time, memory, and/or other computing resources, thereby reducing overall performance by a measurable quantity.

In box 415, the management service 221 determines that the performance improvement and/or cost reduction outweigh or overcome the performance penalty. In one example, the performance penalty may cancel out the performance improvement, but the customer and/or the cloud provider network may benefit from a cost reduction. In another example, the performance improvement may be greater than the performance penalty, resulting in a net performance improvement. In still another example, the performance penalty may exceed a performance improvement, but the cost reduction may be substantial and desirable for the user. The management service 221 may also determine from the hardware support status 236 (FIG. 2) that a computing device 215 having the first computing architecture may be deprecated, unsupported, or unavailable, thus making it desirable not to use that computing device 215 and to execute the VM instance 101 on a different type of computing device 215. In other scenarios, the management service 221 may determine that an improvement in flexibility of managing a pool of hosts with respect to supply pipelines may outweigh any performance penalty.

In box 421, the management service 221 launches the VM instance 101 in a computing device 215 having the second computing architecture using an emulation layer 109, or otherwise assigns the VM instance 101 for execution in that computing device 215. In one scenario, the management service 221 may inform the user that the VM instance 101 has been launched in the computing device 215 having the second computing architecture using the emulation layer 109. In another scenario, the management service 221 may refrain from notifying the user of the underlying hardware used to launch the VM instance 101. Thereafter, the operation of the portion of the management service 221 ends.

Figure 5:
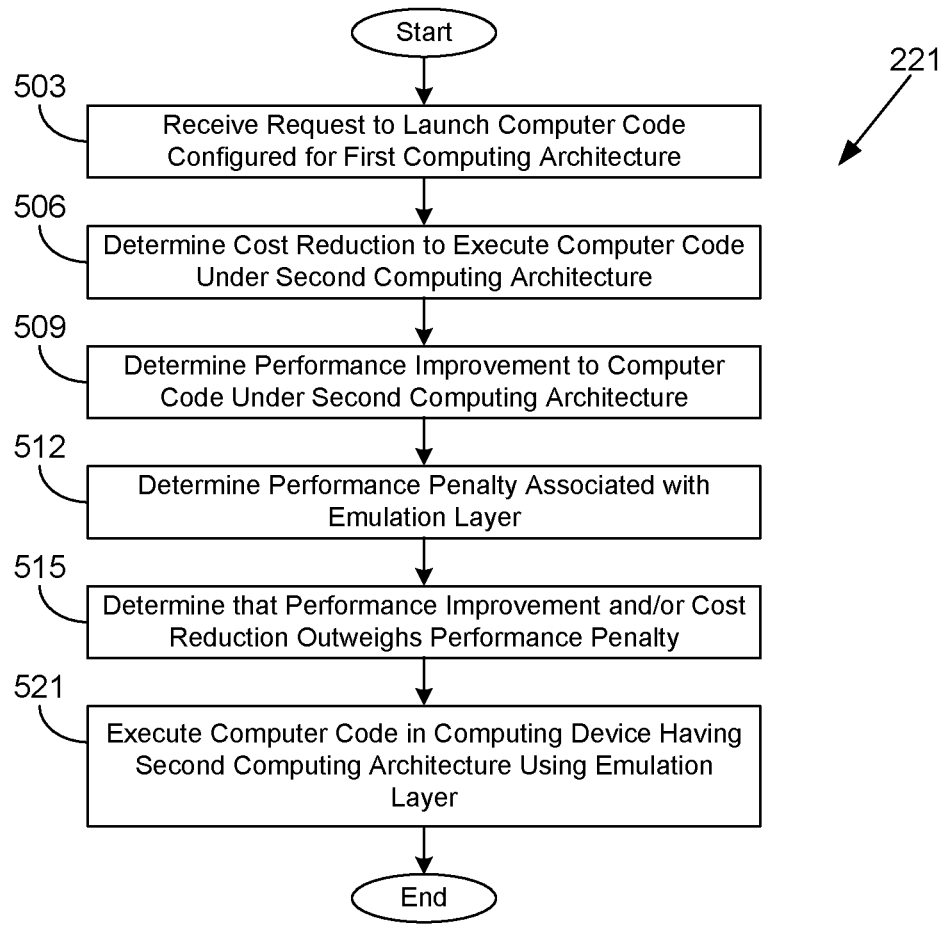

Moving on to FIG. 5, shown is a flowchart that provides one example of the operation of another portion of the management service 221 according to various embodiments. It is understood that the flowchart of FIG. 5 provides merely an example of the many different types of functional arrangements that may be employed to implement the operation of the portion of the management service 221 as described herein. As an alternative, the flowchart of FIG. 5 may be viewed as depicting an example of elements of a method implemented in the computing environment 203 (FIG. 2) according to one or more embodiments.

Beginning with box 503, the management service 221 receives a request to launch computer code such as executable code 242 (FIG. 2) configured for a first computing architecture. The computer code may be provided with zero or more input parameters and/or environmental parameters for execution under a utility computing model. The computer code may correspond to a function, a containerized application, or other code that is executed within a serverless environment. In one scenario, the request is received from a customer via the client application 248 (FIG. 2) over the network 209 (FIG. 2). In another scenario, the request is generated automatically. In one example, the request specifies that the computer code should be executed on a specific type of computing device 215 (FIG. 2) having a second computing architecture. In another example, the request may leave a particular type of computing device 215 or computing architecture unspecified.

In box 506, the management service 221 determines from the cost data 227 (FIG. 2) a cost reduction associated with executing the computer code in a computing device 215 having the second computing architecture as opposed to executing the computer code natively in a computing device 215 having the first computing architecture. For example, the computing device 215 may be less costly for a customer to use due to lower acquisition costs, lesser rack space, lower power consumption, lesser cooling requirements, and so on.

In box 509, the management service 221 determines from the performance data 230 (FIG. 2) a performance improvement to execute the computer code in the computing device 215 having the second computing architecture as opposed to a computing device 215 having the first computing architecture. The computing device 215 having the second computing architecture may have a faster processor 300 (FIG. 2), an increased quantity of processors 300 or processing cores, more memory, a faster bus, and/or other characteristics that result in a performance improvement.

In box 512, the management service 221 determines from the performance data 230 a performance penalty associated with the emulation layer 109 (FIG. 2). To execute the computer code under the emulation layer 109, there may be a performance penalty. In other words, the emulation functionality may have an overhead that consumes processor time, memory, and/or other computing resources, thereby reducing overall performance by a measurable quantity.

In box 515, the management service 221 determines that the performance improvement and/or cost reduction outweigh or overcome the performance penalty. In one example, the performance penalty may cancel out the performance improvement, but the customer and/or the cloud provider network may benefit from a cost reduction. In another example, the performance improvement may be greater than the performance penalty, resulting in a net performance improvement. In still another example, the performance penalty may exceed a performance improvement, but the cost reduction may be substantial and desirable for the user. The management service 221 may also determine from the hardware support status 236 (FIG. 2) that a computing device 215 having the first computing architecture may be deprecated, unsupported, or unavailable, thus making it desirable not to use that computing device 215 and to execute the computer code on a different type of computing device 215. In other scenarios, the management service 221 may determine that an improvement in flexibility of managing a pool of hosts with respect to supply pipelines may outweigh any performance penalty.

In box 521, the management service 221 launches the computer code in a computing device 215 having the second computing architecture using an emulation layer 109, or otherwise assigns the computer code for execution in that computing device 215. In one scenario, the management service 221 may inform the user that the computer code has been launched in the computing device 215 having the second computing architecture using the emulation layer 109. In another scenario, the management service 221 may refrain from notifying the user of the underlying hardware used to launch the computer code. Thereafter, the operation of the portion of the management service 221 ends.

Figure 6:
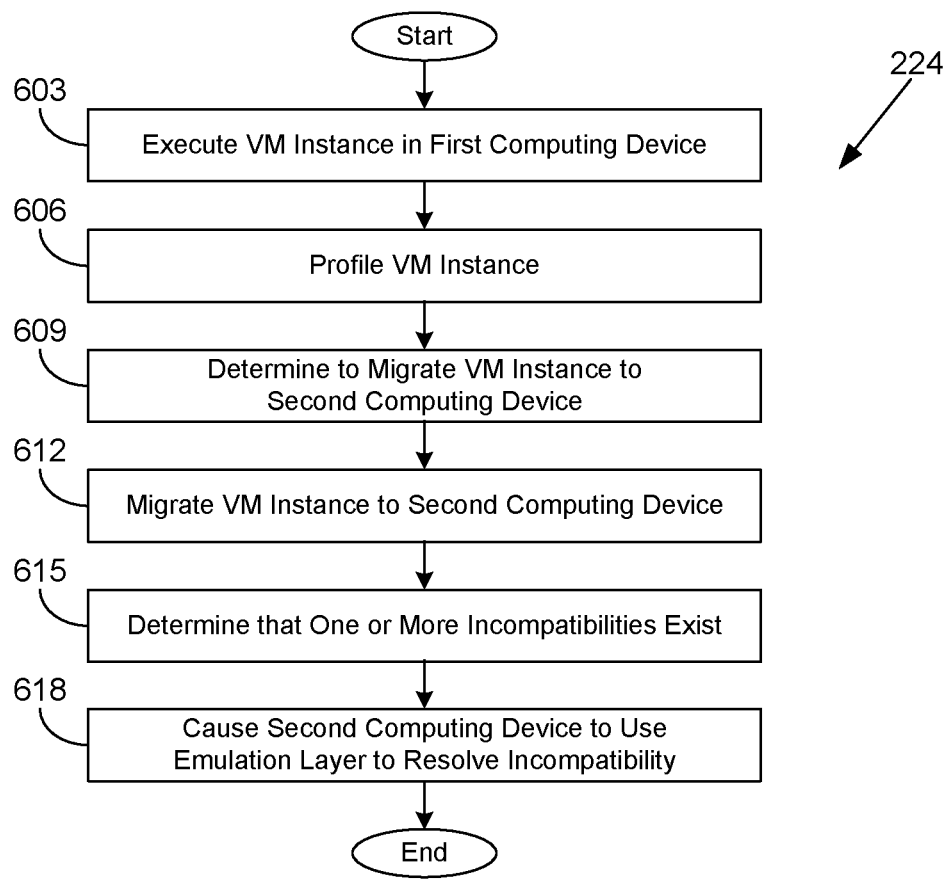
FIG. 6 is a flowchart illustrating one example of functionality implemented as portions of a migration application executed in a computing environment in the networked environment of FIG. 2 according to various embodiments of the present disclosure.

Turning now to FIG. 6, shown is a flowchart that provides one example of the operation of a portion of the migration service 224 according to various embodiments. It is understood that the flowchart of FIG. 6 provides merely an example of the many different types of functional arrangements that may be employed to implement the operation of the portion of the migration service 224 as described herein. As an alternative, the flowchart of FIG. 6 may be viewed as depicting an example of elements of a method implemented in the computing environment 203 (FIG. 2) according to one or more embodiments.

Beginning with box 603, the migration service 224 determines that a VM instance 101 (FIG. 2) is being executed in a first computing device 215 (FIG. 2) having a first computing architecture. The VM instance 101 may be configured for execution in a type of computing device 215 such as the first computing device 215, or specifically under the first computing architecture.

In box 606, the migration service 224 profiles the VM instance 101, thereby generating VM profile data 239 (FIG. 2). In this regard, the migration service 224 may perform a static analysis and/or a dynamic analysis to understand what resources of the first computing device 215 are actually used or are predicted to be used by the VM instance 101. For example, the migration service 224 may determine by this profiling that the VM instance 101 uses local storage of the computing device 215 or, alternatively, that the VM instance 101 does not use the local storage. The profiling may also be used to determine or estimate a performance penalty associated with an emulation layer 109 (FIG. 2) if a migration is performed. For example, the profiling may determine that the VM instance 101 frequently generates a number of instructions that are more complex to emulate, or the profiling may determine that the VM instance 101 generates mostly simple instructions that are efficiently emulated.

In box 609, the migration service 224 determines to migrate the VM instance 101 to a second computing device 215 having a second computing architecture. In one scenario, the migration service 224 may receive a migration request from a user via a client application 248 (FIG. 2) over the network 209 (FIG. 2). In another scenario, the determination to migrate the VM instance 101 may be made automatically by the migration service 224 based upon the first computing device 215 being deprecated, unsupported, or otherwise unavailable, and/or to reduce cost to the customer or to the cloud provider network, and/or to improve performance of the VM instance 101.

In particular, the migration service 224 may determine that a performance improvement and/or cost reduction outweigh or overcome a performance penalty associated with using an emulation layer 109. In one example, the performance penalty may cancel out the performance improvement, but the customer and/or the cloud provider network may benefit from a cost reduction. In another example, the performance improvement may be greater than the performance penalty, resulting in a net performance improvement. In still another example, the performance penalty may exceed a performance improvement, but the cost reduction may be substantial and desirable for the user. In yet another example, the migration service 224 determines to migrate the VM instance 101 to more flexibly manage hardware for a cloud computing provider.

In box 612, the migration service 224 migrates the VM instance 101 to the second computing device 215. For example, the migration service 224 may make a copy of the VM instance 101 from the memory and/or processor state of the computing device 215 and transfer that copy to the second computing device 215. This may be referred to as a live migration. This may also involve redirecting hostnames, network addresses, and/or other identifiers in order to reach the VM instance 101 at the destination second computing device 215.

In box 615, the migration service 224 determines that one or more incompatibilities exist for the VM instance 101 under the second computing device 215. For example, the migration service 224 may determine from the VM profile data 239 that the incompatibility exists. Alternatively, while the VM instance 101 is executed in the second computing device 215, the emulation layer 109 may trap an unsupported instruction or a system call to an unavailable feature.

In box 618, the migration service 224 causes the second computing device 215 to use the emulation layer 109 to execute the VM instance 101. The emulation layer 109 emulates the first computing architecture under the second computing architecture, thereby resolving one or more identified incompatibilities for the VM instance 101. Thereafter, the operation of the portion of the migration service 224 ends.

Although the flowchart of FIG. 6 discusses migrating a VM instance 101 from one computing device 215 to another, the principles of FIG. 6 also apply to migrating computer code such as executable code 242 (FIG. 2) from execution under one type of platform using a first computing architecture to another type of platform using a second computing architecture. In some cases, the computer code may be executed in a serverless environment using a container, but the container and/or the code may be specific to a certain architecture, and thus, an emulation technique may be necessary to adapt to a change in hardware. In various scenarios, a VM instance 101 may be migrated into a container, or a container may be migrated into a VM instance 101, and emulation techniques as described may be used to adapt to an architecture change.

Figure 7:
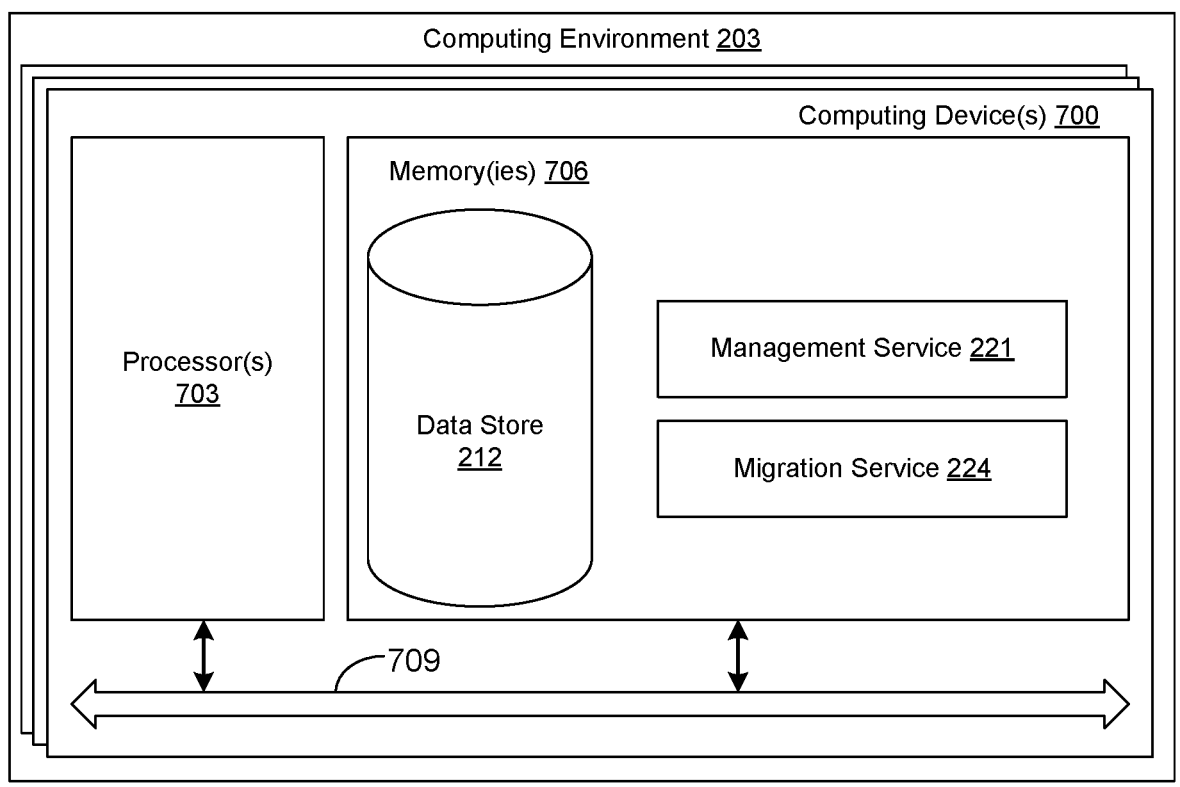
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the management service 221, the migration service 224, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the management service 221, the migration service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the management service 221 and the migration service 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the management service 221 and the migration service 224, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management service 221 and the migration service 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be represented in the following clauses:

Clause 1. A non-transitory computer-readable medium embodying a program executable in at least one computing device, wherein when executed the program causes the at least one computing device to at least: receive a request to launch a virtual machine instance using a virtual machine image, the virtual machine image being configured for execution under a first computing architecture; determine a cost reduction associated with use of a second computing architecture instead of the first computing architecture; determine a performance improvement associated with use of the second computing architecture instead of the first computing architecture; determine a performance penalty associated with executing an emulation layer in the second computing architecture to emulate the first computing architecture; and launch the virtual machine instance in a computing device having the second computing architecture using the emulation layer to emulate the first computing architecture, the virtual machine instance being launched in the computing device having the second computing architecture based at least in part on the cost reduction and determining that the performance improvement overcomes the performance penalty.

Clause 2. The non-transitory computer-readable medium of clause 1, wherein the first computing architecture corresponds to an x86 architecture, and the second computing architecture corresponds to an ARM architecture.

Clause 3. The non-transitory computer-readable medium of clause 1, wherein the virtual machine instance is launched in the computing device having the second computing architecture further based at least in part on determining that a second computing device having the first computing architecture is unavailable.

Clause 4. A system, comprising: at least one computing device; and instructions executable in the at least one computing device, wherein when executed the instructions cause the at least one computing device to at least: receive a request to launch computer code configured for execution under a first computing architecture; determine that a first computing device having a second computing architecture provides at least one of a cost reduction, a flexibility improvement, or a performance improvement over a second computing device having the first computing architecture; and assign the computer code for execution in the first computing device using an emulation layer to emulate the first computing architecture in response to the at least one of the cost reduction or the performance improvement.

Clause 5. The system of clause 4, wherein when executed the instructions further cause the at least one computing device to at least: determine a performance penalty associated with using the emulation layer in the first computing device to execute the computer code as compared to executing the computer code in the second computing device having the first computing architecture; and determine that the performance improvement at least overcomes the performance penalty.

Clause 6. The system of clause 4, wherein when executed the instructions further cause the at least one computing device to at least: determine a performance penalty associated with using the emulation layer in the first computing device to execute second computer code configured for execution under the first computing architecture as compared to executing the second computer code in the second computing device having the first computing architecture; determine that the performance improvement does not overcome the performance penalty; and assign the second computer code for execution in the second computing device instead of the first computing device.

Clause 7. The system of clause 4, wherein the computer code corresponds to a virtual machine image that includes an operating system that is executable in the first computing architecture.

Clause 8. The system of clause 7, wherein when executed the instructions further cause the at least one computing device to at least launch a virtual machine instance corresponding to the virtual machine image in the first computing device using the emulation layer.

Clause 9. The system of clause 4, wherein the computer code corresponds to binary code compiled for the first computing architecture, the binary code including at least one instruction incompatible with the second computing architecture.

Clause 10. The system of clause 4, wherein the emulation layer emulates in the first computing device, using a network-based storage, a local storage of the second computing device having the first computing architecture.

Clause 11. The system of clause 4, wherein the emulation layer emulates in the first computing device a graphics processing unit of the second computing device having the first computing architecture, the graphics processing unit being absent from the first computing device.

Clause 12. The system of clause 4, wherein the first computing device includes at least one hardware resource to implement the emulation layer at least partially in hardware.

Clause 13. A method, comprising: receiving a request to launch a virtual machine instance using a virtual machine image, the virtual machine image being configured for execution under a first computing architecture; and executing the virtual machine instance in a computing device having a second computing architecture by using an emulation layer in the computing device to emulate the first computing architecture in the second computing architecture.

Clause 14. The method of clause 13, wherein a first processor instruction set of the first computing architecture differs from a second processor instruction set of the second computing architecture.

Clause 15. The method of clause 13, wherein the second computing architecture of the computing device is unspecified in the request.

Clause 16. The method of clause 13, wherein the second computing architecture of the computing device is specified in the request.

Clause 17. The method of clause 13, wherein the virtual machine image is incompatible with the second computing architecture without the emulation layer.

Clause 18. The method of clause 13, further comprising determining to execute the virtual machine instance in the computing device based at least in part on a lower cost associated with executing the virtual machine instance in the computing device as compared to another computing device that natively implements the first computing architecture.

Clause 19. The method of clause 13, further comprising determining to execute the virtual machine instance in the computing device based at least in part on a performance improvement associated with the computing device as compared to another computing device that natively implements the first computing architecture.

Clause 20. The method of clause 19, further comprising determining to execute the virtual machine instance in the computing device further based at least in part on the performance improvement exceeding a performance penalty associated with execution of the emulation layer.

Clause 21. A non-transitory computer-readable medium embodying a program executable in at least one computing device, wherein when executed the program causes the at least one computing device to at least: execute a virtual machine instance in a first computing device having a first computing architecture, the first computing device being in a cloud provider network; determine to migrate the virtual machine instance to a second computing device having a second computing architecture in the cloud provider network based at least in part on the first computing device being deprecated by the cloud provider network; migrate the virtual machine instance to the second computing device without terminating the virtual machine instance; determine that an incompatibility exists for the virtual machine instance in the second computing device; and cause the second computing device to emulate the first computing architecture for the virtual machine instance in the second computing device using an emulation layer.

Clause 22. The non-transitory computer-readable medium of clause 21, wherein when executed the program further causes the at least one computing device to at least determine that a performance improvement associated with the second computing device overcomes a performance penalty associated with use of the emulation layer.

Clause 23. A system, comprising: at least one computing device; and instructions executable in the at least one computing device, wherein when executed the instructions cause the at least one computing device to at least: execute a virtual machine instance in a first computing device; migrate the virtual machine instance to a second computing device; determine that an incompatibility exists for the virtual machine instance in the second computing device; and cause the second computing device to emulate at least one feature of the first computing device for the virtual machine instance in the second computing device.

Clause 24. The system of clause 23, wherein the virtual machine instance is migrated based at least in part on the first computing device being deprecated by a utility computing provider.

Clause 25. The system of clause 23, wherein the virtual machine instance is migrated based at least in part on a cost reduction to an operator of the virtual machine instance for executing the virtual machine instance in the second computing device instead of the first computing device.

Clause 26. The system of clause 23, wherein the virtual machine instance is migrated in response to a request to migrate received from an operator of the virtual machine instance.

Clause 27. The system of clause 23, wherein the virtual machine instance is migrated without terminating the virtual machine instance.

Clause 28. The system of clause 23, wherein migrating the virtual machine instance further comprises copying at least a portion of a first memory of the first computing device to a second memory of the second computing device.

Clause 29. The system of clause 23, wherein the at least one feature corresponds to a local storage of the first computing device, and the local storage is emulated using a network-based storage in the second computing device.

Clause 30. The system of clause 23, wherein the at least one feature corresponds to a graphics processing unit of the first computing device, and the graphics processing unit is emulated in a general purpose processor of the second computing device.

Clause 31. The system of clause 23, wherein the at least one feature corresponds to a processor instruction set of the first computing device.

Clause 32. The system of clause 23, wherein the incompatibility comprises an operating system of the virtual machine instance that is incompatible with the second computing device.

Clause 33. The system of clause 23, wherein determining that the incompatibility exists for the virtual machine instance in the second computing device further comprises: trapping an instruction generated by the virtual machine instance; and determining that the instruction is not supported by the second computing device.

Clause 34. A method, comprising: executing a virtual machine instance configured for a first computing architecture in a first computing device having the first computing architecture; migrating the virtual machine instance from the first computing device to a second computing device having a second computing architecture; and executing the virtual machine instance in the second computing device using an emulation layer that emulates the first computing architecture in the second computing architecture.

Clause 35. The method of clause 34, wherein the virtual machine instance includes an operating system compatible with the first computing architecture and incompatible with the second computing architecture.

Clause 36. The method of clause 34, further comprising determining to migrate the virtual machine instance from the first computing device to the second computing device based at least in part on the first computing device being deprecated.

Clause 37. The method of clause 34, further comprising determining to migrate the virtual machine instance from the first computing device to the second computing device based at least in part on a cost reduction associated with executing the virtual machine instance in the second computing device instead of the first computing device.

Clause 38. The method of clause 34, further comprising determining to migrate the virtual machine instance from the first computing device to the second computing device based at least in part on at least one of: a flexibility improvement, a physical space reduction, a cooling requirement reduction, or a power consumption reduction of the second computing device compared to the first computing device.

Clause 39. The method of clause 34, further comprising determining to migrate the virtual machine instance from the first computing device to the second computing device based at least in part on a performance improvement associated with executing the virtual machine instance in the second computing device instead of the first computing device.

Clause 40. The method of clause 39, further comprising determining to migrate the virtual machine instance from the first computing device to the second computing device based at least in part on determining that the performance improvement overcomes a performance penalty associated with executing the emulation layer.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
- execute a virtual machine instance in a first computing device having a first computing architecture, the first computing device being in a cloud provider network;
- determine to migrate the virtual machine instance to a second computing device having a second computing architecture in the cloud provider network based at least in part on the first computing device being deprecated by the cloud provider network;
- migrate the virtual machine instance to the second computing device without terminating the virtual machine instance;
- determine that an incompatibility exists for the virtual machine instance in the second computing device;
- determine that an improvement in a performance metric that is identified for the virtual machine instance executed on the second computing device is greater than a penalty to the performance metric corresponding to use of an emulation layer that resolves the incompatibility; and
- cause the second computing device to emulate the first computing architecture for the virtual machine instance in the second computing device using the emulation layer.

2. The non-transitory computer-readable medium of claim 1, wherein the virtual machine instance continues to execute on the first computing device during a migration process that migrates the virtual machine instance to the second computing device.

3. A system, comprising:
- at least one computing device; and
- instructions executable in the at least one computing device, wherein when executed the instructions cause the at least one computing device to at least:
- execute a virtual machine instance in a first computing device;
- migrate the virtual machine instance to a second computing device;
- determine that an incompatibility exists for the virtual machine instance in the second computing device;
- determine that an improvement in a performance metric that is identified for the virtual machine instance executed on the second computing device is greater than a penalty to the performance metric corresponding to use of an emulation layer that resolves the incompatibility; and
- cause the second computing device to emulate at least one feature of the first computing device for the virtual machine instance in the second computing device.

4. The system of claim 3, wherein the virtual machine instance is migrated based at least in part on the first computing device being deprecated by a utility computing provider.

5. The system of claim 3, wherein the virtual machine instance is migrated based at least in part on a cost reduction to an operator of the virtual machine instance for executing the virtual machine instance in the second computing device instead of the first computing device.

6. The system of claim 3, wherein the virtual machine instance is migrated in response to a request to migrate received from an operator of the virtual machine instance.

7. The system of claim 3, wherein the virtual machine instance is migrated without terminating the virtual machine instance.

8. The system of claim 3, wherein migrating the virtual machine instance further comprises copying at least a portion of a first memory of the first computing device to a second memory of the second computing device.

9. The system of claim 3, wherein the at least one feature corresponds to a local storage of the first computing device, and the local storage is emulated using a network-based storage in the second computing device.

10. The system of claim 3, wherein the at least one feature corresponds to a graphics processing unit of the first computing device, and the graphics processing unit is emulated in a general purpose processor of the second computing device.

11. The system of claim 3, wherein the at least one feature corresponds to a processor instruction set of the first computing device.

12. The system of claim 3, wherein the incompatibility comprises an operating system of the virtual machine instance that is incompatible with the second computing device.

13. The system of claim 3, wherein determining that the incompatibility exists for the virtual machine instance in the second computing device further comprises:
- trapping an instruction generated by the virtual machine instance; and
- determining that the instruction is not supported by the second computing device.

14. A method, comprising:
- executing a virtual machine instance configured for a first computing architecture in a first computing device having the first computing architecture;
- migrating the virtual machine instance from the first computing device to a second computing device having a second computing architecture;
- determining that an improvement in a performance metric that is identified for the virtual machine instance executed on the second computing device is greater than a penalty to the performance metric corresponding to use of an emulation layer; and
- executing the virtual machine instance in the second computing device using the emulation layer that emulates the first computing architecture in the second computing architecture.

15. The method of claim 14, wherein the virtual machine instance includes an operating system compatible with the first computing architecture and incompatible with the second computing architecture.

16. The method of claim 14, further comprising determining to migrate the virtual machine instance from the first computing device to the second computing device based at least in part on the first computing device being deprecated.

17. The method of claim 14, further comprising determining to migrate the virtual machine instance from the first computing device to the second computing device based at least in part on a cost reduction associated with executing the virtual machine instance in the second computing device instead of the first computing device.

18. The method of claim 14, further comprising determining to migrate the virtual machine instance from the first computing device to the second computing device based at least in part on at least one of: a flexibility improvement, a physical space reduction, a cooling requirement reduction, or a power consumption reduction of the second computing device compared to the first computing device.

19. The method of claim 14, wherein the virtual machine instance continues to execute on the first computing device during a migration process that migrates the virtual machine instance to the second computing device.

20. The method of claim 19, further comprising determining to migrate the virtual machine instance from the first computing device to the second computing device based at least in part on determining that the improvement overcomes a performance penalty associated with executing the emulation layer.

* * * * *